Figure 1:
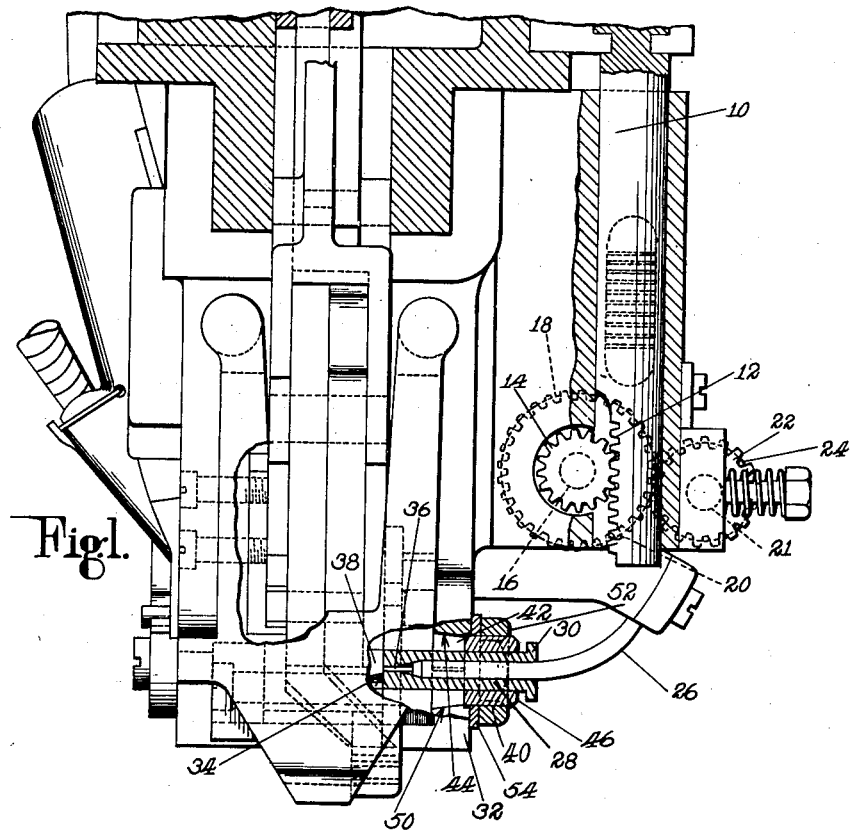

Nov. 23, 1943.　　　R. H. LAWSON　　　2,334,715
FASTENING INSERTING MACHINE
Filed May 13, 1942

INVENTOR
Robert H. Lawson
By his attorney

Patented Nov. 23, 1943

2,334,715

UNITED STATES PATENT OFFICE 2,334,715

FASTENING INSERTING MACHINE

Robert H. Lawson, Beverly, Mass., assignor to United Shoe Machinery Corporation, Flemington, N. J., a corporation of New Jersey Application May 13, 1942, Serial No. 442,786

11 Claims. (Cl. 1—2)

This invention relates to fastening inserting machines and more particularly to wire feeding and severing mechanisms for use in such machines and the invention is illustrated herein by way of example as embodied in a staple fastening machine of the type disclosed in Letters Patent of the United States No. 1,963,171 granted June 19, 1934 on an application filed in my name.

Machines of the type referred to are provided with wire feeding and severing means and with fastening forming and inserting mechanisms, the latter usually including an outside former mounted for reciprocating movement relatively to an inside former for bending a severed piece of wire around the inside former to form a fastening, such as a staple. The reciprocating outside former is provided with a sharp cutting edge on the bottom of one of its sides, this cutting edge cooperating with a flat surface on the inner end of a stationary member to sever pieces from a continuous length of wire fed to the severing means, the wire passing through an opening in the stationary member which is in the form of a cylindrical nozzle and serves also as a guiding member for guiding the wire into position relatively to the severing means and fastening forming mechanism.

Since the flat end face on the stationary guiding member or nozzle provides an anvil with which the reciprocating outside former cooperates to sever the wire, it is important that this end face be positioned accurately with respect to the reciprocating member or outside former. Normally the inner end face of the guiding nozzle should be positioned as close as possible to the outside former in order to produce a good cutting action but, on the other hand, it should not be positioned so close that it touches the outside former or bears against it since this would bend the former and produce a rubbing or binding action that would prevent the parts from operating properly and it might create so much friction that the parts would break or wear out much too quickly.

Heretofore in a machine of this type the wire guiding or feeding nozzle has usually been held in position relatively to the reciprocating severing member by mounting the nozzle in a cylindrical opening in a fixed portion of the machine such as a frame member and securing it in the frame member by one or more locking nuts threaded onto the nozzle. With this construction, the inner nut would bear against the frame member and the outer nut would bear against the inner nut and thus lock the nozzle against accidental turning. In adjusting the nozzle, it would first be slid inwardly in the frame until it engaged the outside former when the latter was in its lower position, and then the nozzle would be backed away from the former a slight amount for clearance, after which the nuts would be threaded up tight against the frame to secure the nozzle rigidly in position.

Instead of using two locking nuts as above described, another method sometimes employed was to thread the nozzle itself into a tapped hole in the frame member and provide it with a hexagonal head whereby it could be turned and adjusted in the frame relatively to the outside former. In this case, only a single locking nut would be necessary for securing or locking the nozzle in place after it had been positioned or adjusted relatively to the reciprocating severing member.

While the foregoing methods of holding the wire guiding nozzle in position relatively to the reciprocating severing member were satisfactory and usually permitted the proper adjustment to be obtained, nevertheless, considerable care had to be exercised in adjusting the nozzle and in locking it in position, which often took too much time, particularly with a new or inexperienced operator. In other words, although the nozzle could be positioned accurately by such methods if the operator used reasonable care, it was possible for a careless or inexperienced operator to locate the nozzle too close to the outside former so that it would interfere with the operation of the mechanism or might even break the mechanism.

The reason the nozzle might be adjusted too close to the outside former in such cases was that, in securing the nozzle in position after it had been adjusted, the locking nut or nuts had to be threaded inwardly against the frame member which, of course, was in a direction that would tend also to move the nozzle itself inwardly toward the outside former if the nozzle should turn or rotate a little with the nuts, for example, because of the increased friction between the threads on the nozzle and the locking nuts in tightening the nuts. Consequently, if too much force were exerted in tightening the nuts, as for example, through using too large a wrench, some rotation of the nozzle with the nuts might result, thereby causing the nozzle to move a short distance inwardly toward the outside former. Since these two members should be positioned as close together as possible without hitting or rubbing, movement of the nozzle even a few thousandths of an inch inwardly might be sufficient to cause the nozzle to bear or press too hard against the outside former and thus interfere with the proper operation of the mechanism.

An object of the present invention is to provide improved means in a machine of the type referred to for holding an adjustable member in fixed relation to a reciprocating member which cooperates with the adjustable member to sever pieces from a length of material such as wire fed thereto, said improved means being arranged to hold the adjustable member in such a manner with respect to the reciprocating member that the difficulties pointed out above will be eliminated.

To this end the invention provides, as herein illustrated, improved friction means for holding a stationary member, such as a wire guiding or feeding nozzle, in fixed relation to a reciprocating severing member such as an outside former, which cooperates with the nozzle to sever pieces from a continuous length of wire fed thereto. As herein illustrated, the friction means comprises a cylindrical member surrounding the nozzle and adapted to open and close thereby to release or to grip the nozzle, respectively. When the cylindrical member is open it releases the nozzle and permits it to be adjusted relatively to the reciprocating severing member and, when closed, it grips the nozzle and holds or locks it positively against movement with respect to the severing member. Moreover, as illustrated herein, when the cylindrical member is being closed to cause it to grip the nozzle, it operates also to move the nozzle positively a predetermined distance away from the reciprocating severing member.

In accordance with the present invention, the friction means or cylindrical member, as herein illustrated, comprises a spring collet surrounding the nozzle and having a tapered outer surface thereon arranged to engage a correspondingly tapered surface in an opening in a frame member of the machine. Means is also provided on the spring collet for opening and closing said collet, this means, as herein illustrated, comprising a nut threaded on a cylindrical portion of the collet and arranged, through cooperation with the frame member, to move said tapered surfaces into positive frictional engagement with each other, thereby closing the collet and causing it to grip the nozzle and lock it in position. In moving the tapered surfaces into said frictional engagement, as described, the nut moves the collet a predetermined distance outwardly or away from the severing member or outside former. Consequently, when the collet has been closed and is gripping the feeding nozzle, it moves the nozzle positively a predetermined distance away from the reciprocating severing member or outside former.

The present construction thus provides improved means for holding or maintaining a wire guiding nozzle in predetermined fixed relation to a reciprocating severing member, such, for example, as an outside former, which cooperates with the nozzle to sever pieces from a length of wire which is fed to the mechanism and the construction also insures that some space or clearance will always be provided between the severing member and the nozzle irrespective of the force applied to the locking nut in closing or locking the collet. Consequently, any danger of the nozzle in a mechanism of this type being adjusted too close to the reciprocating severing member is entirely avoided.

With the above and other objects and features in view, the invention will now be described in detail in connection with the accompanying drawing and will thereafter be pointed out in the claims.

Figure 2:
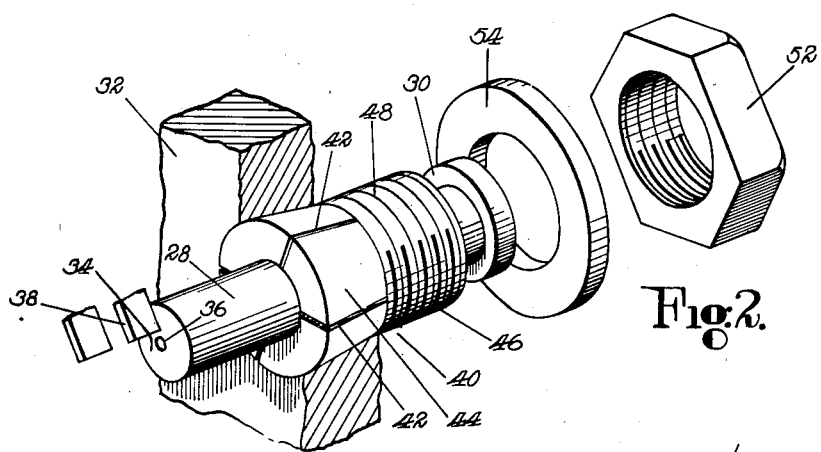

In the drawing,

Fig. 1 is a front elevational view, partly broken away and in section, of a portion of the mechanism of a fastening inserting machine in which the present invention is embodied; and Fig. 2 is an enlarged perspective view of the wire guiding member of the mechanism and means for holding said member in the machine.

The invention is illustrated herein by way of example as embodied in a fastening inserting machine of the type disclosed in my prior patent referred to above. A fastening inserting machine of the type shown in that patent is provided with two sets of fastening forming and inserting mechanisms or units each of which is arranged to form and drive fastenings, such as staples, into a work piece such, for example, as a shoe. This fastening forming and inserting mechanism is fully disclosed in the patent above referred to and, since the greater portion of this mechanism forms no part of the present invention, the entire unit will not be described herein but only those portions will be described which are necessary for a complete understanding of the invention. Each fastening forming and inserting mechanism or unit, as illustrated in Fig. 1, is provided with means for feeding the wire which is to form the fastenings or staples to the fastening forming and inserting mechanism, this feeding means being of the type disclosed in Letters Patent of the United States No. 1,854,204, granted April 19, 1932, upon an application of mine. The wire feeding mechanism comprises a pair of feed rolls operated by a reciprocating rod 10 provided with rack teeth 12 which engage a pinion 14 mounted on a short horizontal shaft 16. The shaft 16 carries a pawl arranged to engage a ratchet wheel (not shown) loosely mounted on the shaft 16 and having rigidly secured thereto a feed roll 18. The feed roll 18 has a gear 20 secured thereto which meshes with a pinion 22 mounted on a second horizontal shaft 21, the pinion 22 having rigidly secured thereto a second feed roll 24. This pawl and ratchet arrangement, through the reciprocating movement of the rod 10, causes the feed rolls 18 and 24 to be rotated step-by-step to feed appropriate lengths of a continuous length of wire from a reel to the fastening forming and inserting mechanisms.

The wire is fed downwardly by the feed rolls 18 and 24 through a curved tube 26 to the staple forming mechanism, the tube 26 terminating in a straight portion which fits into a horizontal opening or hole in a wire guiding member or nozzle 28. As shown in the drawing, the wire guiding nozzle 28 is cylindrical in shape and is provided with a flange or shoulder 30 at its right-hand end, the nozzle extending inwardly or to the left through an opening in a fixed frame member 32 which, at this portion of the machine, consists of a vertical wall of substantial thickness.

The wire guiding nozzle 28 projects inwardly a substantial distance beyond the frame member 32 and terminates in a flat end face 34, the hole which receives the wire guiding tube 26 being reduced at this end of the nozzle to provide an opening 36 only slightly larger than the wire to be fed. The end face 34 of the guiding nozzle is arranged to cooperate with a reciprocating member 38 (Fig. 1) to sever the continuous length of wire fed into the mechanism into pieces from which fastenings may be formed. The reciprocating severing member 38, as herein illustrated, also constitutes the outside former of the staple forming mechanism, this outside former, as is usual in such machines, having a bifurcated or inverted U-shaped lower portion and being mounted for heightwise reciprocating movement relatively to the frame member and to a stationary inside former or anvil (not shown) over which the outside former bends the wire to form a staple after the outside former has severed the wire. The right-hand side portion of the outside former, as viewed in Fig. 1, reciprocates past, and cooperates with, the inner end face 34 of the guiding nozzle 28 to sever the wire and, accordingly, this side portion is provided with a sharp cutting edge at its lower end which, in conjunction with the edge face 34, operates to shear or sever the wire each time the outside former moves downwardly.

It will be seen from the foregoing, that the position of the inner end face or anvil 34 of the nozzle 28 relatively to the reciprocating outside former 38 is important if the cutting surfaces of these two cooperating members are to function properly in severing or shearing the wire. For the best results, the inner end face 34 of the wire guiding nozzle should be positioned close enough to the cutting edge of the outside former to produce a good cutting action. Some space or clearance should obviously be provided, however, between the two cutting surfaces or edges in order that they will not engage each other and cause the mechanism to rub or bind during its operation or create so much friction that the parts will break or wear out too quickly. It will be clear, therefore, that the feeding nozzle 28 should never be positioned in the frame member 32, either intentionally or by accident, so that the inner end face 34 of the nozzle is located too close to the reciprocating member or extends into the path of its reciprocating movement.

In order to position and hold the wire guiding nozzle 28 in proper relation to the reciprocating member or outside former 38, and to insure that the nozzle will never be positioned so close to the outside former that it will interfere with the operation of the mechanism, the positioning of the nozzle, in accordance with the present invention, is accomplished by friction means which, as herein illustrated, comprises a spring collet 40. As illustrated in Figs. 1 and 2, the spring collet 40 surrounds the cylindrical guiding nozzle 28 so that, when the collet is open, as shown in Fig. 2, the nozzle may slide therein toward and away from the outside former 38, thereby permitting the nozzle to be readily adjusted relatively to said outside former. The forward or left-hand portion of the spring collet is split by slots 42 located approximately at right angles to each other so that this forward portion, although normally open or expanded, may be sprung inwardly by pressure to close the spring collet and cause it to grip the nozzle and lock it against sliding movement therein. An outer surface 44 on this forward or split portion of the collet is tapered from front to rear on an incline or angle of about 5° or 6° to the longitudinal axis of the collet. The rear portion 46 of the collet is not slotted like the forward portion but is of solid cylindrical construction and is provided on its outer surface with screw threads 48 which, as illustrated, are the usual or right-hand type of threads.

The tapered outer surface 44 of the spring collet is arranged to fit into a correspondingly tapered surface 50 in the opening or hole formed in the frame member 32 with the threaded rear portion 46 of the collet projecting outwardly beyond the frame a substantial distance to the right, as shown in Fig. 1. A nut 52 is threaded onto this outwardly extending portion of the collet and a washer 54 is located between the nut and the frame member 32. By rotating the nut toward the right on the threaded portion of the collet, the nut and washer 54 are moved forcibly against the frame member 32 and the spring collet is moved outwardly or to the right relatively to the frame member to bring the tapered surfaces on the collet and frame member into positive frictional engagement with each other. Engagement of the tapered portion of the spring collet with the tapered surface in the frame member under the action of the nut 52 closes the spring collet forcibly around the nozzle 28 and causes the collet to grip the nozzle and hold or lock it positively against sliding movement in the collet. The last part of the rotation of the nut 52 toward the right against the frame member 32 to tighten the nut sufficiently to hold the parts positively in closed or locked position operates to move the spring collet still more forcibly or firmly into frictional engagement with the tapered opening in the frame member.

Since the spring collet at that time is in positive gripping relation with the nozzle 28, so that the latter cannot move with respect to the collet, it will be evident that this final rotation or turning action of the nut to tighten it firmly against the washer and frame member operates also to move the collet and nozzle together as a unit a slight distance further outwardly or toward the right of the frame member which is also away from the reciprocating severing member or outside former 38. Consequently, the inner end face 34 of the guiding nozzle 28, with which the reciprocating member or outside former cooperates to sever the wire, is always moved a slight distance away from the outside former or, if said former happens to be located in its uppermost position, a slight distance away from the path of its reciprocating movement, during the final tightening or turning action of the nut 52.

It will be seen, therefore, that regardless of the pressure or force used to tighten the nut 52 against the frame member 32, the guiding nozzle 28 can not be moved any closer to the outside former or severing member than it was before the nut was tightened. On the other hand, the nozzle will always be moved a slight distance away from the outside former or its path of reciprocating movement whenever the nut is tightened into its final locking position, even though the nut should be tightened more than is necessary to hold the parts locked in position. Moreover, since the outward movement of the spring collet will always be substantially the same for the same turning movement of the nut 52, after the tapered surfaces have been brought into frictional engagement, it follows that the outward movement of the nozzle 28 or its inner end face 34 away from the outside former after the collet has been closed will always be the same for the same tightening action or rotation of the nut 52. In other words, by reason of the present construction, the nozzle or its end face 34, will always be moved positively a predetermined distance away from the reciprocating severing means which is provided by the outside former 38 whenever the nozzle is adjusted relatively to said outside former. Furthermore, the nozzle will thereafter be held by friction means, provided by the spring collet and locking nut 52, positively in fixed relation to the severing means or outside former. It will be seen, therefore, that the present construction eliminates any possibility of the nozzle being positioned too close to the reciprocating outside former or of its being adjusted into the path of movement of the reciprocating former in assembling the mechanism or in making an adjustment.

In assembling the mechanism or adjusting the nozzle as above described, the nut 52 is first loosened from engagement with the frame member 32 to open the collet and release the nozzle for adjustment toward or away from the outside former 38, the outside former being located in its lower or operated position. The nozzle is then slid inwardly until it engages the side of the outside former after which the nut is tightened against the frame member to bring the tapered surfaces of the collet and frame member into frictional engagement, thereby closing the collet and causing it to grip the nozzle. Final tightening action on the nut 52 moves the collet and nozzle together as a unit a predetermined distance away from the outside former so that the nozzle is thereafter held positively in predetermined fixed relation to said outside former.

While the invention has been illustrated herein by way of example as embodied in a fastening inserting machine of the type disclosed in my prior Patent No. 1,963,171 referred to above, said machine being adapted to operate upon shoes, particularly, for securing uppers in overlasted relation to insoles, it will be clear that in its broader aspects the invention is not limited in its use to such machines or such operations but is capable of being utilized in any machine or mechanism wherein a reciprocating member cooperates with a stationary member or anvil which is to be positioned or held in predetermined relation to the reciprocating member.

Having thus described my invention, what I claim as new and desire to secure by Letters Patent of the United States is:

1. A fastening inserting machine having, in combination, means for severing pieces from a length of wire fed to said means, a member for guiding the wire to the severing means and having a face thereon with which the severing means cooperates to sever the wire, and friction means surrounding the guiding member for gripping said member and holding it in fixed relation to the severing means, said friction means being arranged to be moved into gripping relation with said guiding member by movement away from said severing means.

2. A fastening inserting machine having, in combination, a frame member, reciprocating means for severing pieces from a continuous length of wire fed to the reciprocating means, a cylindrical member cooperating with said reciprocating means to sever the wire and through which the wire is fed, and friction-controlled means surrounding said cylindrical member for holding it in predetermined fixed relation to said reciprocating means, said friction-controlled means being arranged to open and close around said cylindrical member to release or to grip and hold said member by movement in said frame member toward and away from said reciprocating means.

3. A fastening inserting machine having, in combination, a frame member, means for severing pieces from a fed-in length of wire, a member having a face thereon with which the severing means cooperates to sever the wire, and friction means for holding said member in fixed relation to the severing means, said friction means being arranged to open and close relatively to said member by expanding and contracting movements, respectively, and when open to release said member for adjustment relatively thereto and when closed to grip said member and to move it positively a predetermined distance away from said severing means by movement of said friction means in said frame member.

4. A fastening inserting machine having, in combination, means mounted for reciprocating movement for severing pieces from a continuous length of wire fed to the reciprocating means, a member for guiding the wire to said reciprocating means and having a face thereon with which the reciprocating means cooperates to sever the wire, and friction means for holding said guiding member in fixed relation to the reciprocating means, said friction means being operable when open to release said guiding member for adjustment relatively to the reciprocating means and when closed to grip said member and to move it positively a predetermined distance away from said reciprocating means, thereby insuring that a clearance space will be provided between the guiding member and said reciprocating means.

5. A fastening inserting machine having, in combination, a reciprocating member for severing pieces from a continuous length of wire fed thereto, a stationary member with which said reciprocating member cooperates to sever the wire, and means operable to hold said stationary member in fixed relation to said reciprocating member, said means being constructed and arranged to move said stationary member positively a predetermined distance away from said reciprocating member whenever said means is operated to hold said stationary member.

6. A fastening inserting machine having, in combination, means for severing pieces from a length of wire fed to the severing means, a stationary member for guiding the wire to said severing means and through which the wire is fed, said member having an end face thereon with which the severing means cooperates to sever the wire, friction means for holding said stationary member in predetermined fixed relation to the severing means and being operable when open to release said member for adjustment toward or away from the severing means and when closed to grip said member and to move it positively a predetermined distance away from said severing means, and means for opening and closing said friction means.

7. A fastening inserting machine having, in combination, wire severing means comprising a stationary member and a member movable relatively to said stationary member and cooperating therewith to sever pieces from a continuous length of wire fed to said severing means, said stationary member being adjustable transversely of the movable member to permit it to be initially located in the plane of movement of said movable member, and means for holding said stationary member, said means being operable to grip said member and to hold it positively in fixed relation to said movable member, said holding means being also arranged to move said stationary member a predetermined distance away from said movable member when said holding means is operated to grip and hold said stationary member, thereby insuring that excessive friction will not be created between said members.

8. A fastening inserting machine having, in combination, wire severing means comprising a stationary cutter and a cutter movable relatively to said stationary cutter for severing pieces from a continuous length of wire, said stationary cutter being adjustable transversely of the path of movement of said movable cutter to permit the stationary cutter to be positioned initially in the plane of action of said movable cutter, and locking means for the stationary cutter constructed and arranged to move said cutter a predetermined distance away from said movable cutter as an incident of its locking action, thereby avoiding undue friction between said cutters.

9. A fastening inserting machine having, in combination, a frame member, means mounted for reciprocating movement relatively to the frame member for severing lengths from a piece of wire fed to the severing means, a nozzle for guiding the wire to said severing means, said nozzle having an end face with which the severing means cooperates to sever the wire, and a spring collet for holding said nozzle in fixed relation to the severing means, said collet having a tapered outer surface arranged to be moved into and out of engagement with a correspondingly tapered opening in the frame member, said collet being operable when moved out of engagement with said tapered opening to open and release the nozzle for transverse adjustment relatively to the severing means and when moved into engagement with said opening to close and grip said nozzle and to hold it positively against movement relatively thereto, said collet being also operable when closed to move said nozzle a predetermined distance away from said severing means.

10. A staple forming and inserting machine having, in combination, a frame member, a staple forming member mounted for reciprocating movement relatively to said frame member and having a cutting edge thereon for severing pieces from a length of wire fed thereto, a nozzle for guiding the wire to the forming member and having a flat end face providing an anvil with which the forming member cooperates to sever the wire, a spring collet surrounding the nozzle for holding the latter and having a tapered outer surface arranged to engage a correspondingly tapered surface in an opening in the frame member, and a nut threaded on the collet and cooperating with said frame member for moving the collet relatively thereto to bring said tapered surfaces into positive frictional engagement, thereby closing the collet and causing it to clamp the nozzle in fixed relation to the staple forming member, said collet moving the nozzle a predetermined distance away from said forming member as an incident of its closing action.

11. A fastening forming and inserting mechanism having, in combination, friction means for holding a wire guiding nozzle in a frame member in fixed relation to a fastening forming member mounted for reciprocating movement past the inner end face of said nozzle and having a cutting edge arranged to cooperate with said end face to sever pieces from a continuous length of wire fed to said forming member through the nozzle, said friction means comprising a spring collet surrounding the nozzle and having a tapered outer surface arranged to engage a correspondingly tapered surface in an opening in the frame member, and a nut threaded on said collet and cooperating with said frame member for closing the spring collet, said nut being arranged to move the tapered surfaces on said collet and said frame member into positive frictional engagement to close the collet and thereby to clamp the nozzle in fixed relation to the fastening forming member, said collet moving the nozzle a predetermined distance away from said forming member during its closing movement.

ROBERT H. LAWSON.